US008660793B2

(12) United States Patent
Ngo et al.

(10) Patent No.: US 8,660,793 B2
(45) Date of Patent: Feb. 25, 2014

(54) EXPEDITING REVERSE GEOCODING WITH A BOUNDING REGION

(75) Inventors: Ngoc Bich Ngo, Kanata (CA); Russell Norman Owen, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 1036 days.

(21) Appl. No.: 12/562,434

(22) Filed: Sep. 18, 2009

(65) Prior Publication Data

US 2011/0072020 A1    Mar. 24, 2011

(51) Int. Cl.
*G01C 21/00*    (2006.01)
(52) U.S. Cl.
USPC ........... 701/520; 701/517; 701/522; 701/532; 709/217; 709/219; 455/456.1; 455/456.3; 707/758
(58) Field of Classification Search
USPC ......... 701/408, 532, 400, 438, 520, 522, 517; 707/736–737, 999.1, 103 Z, 758; 709/217, 219; 455/456.1, 456.3
See application file for complete search history.

(56) References Cited

U.S. PATENT DOCUMENTS

| | | | | |
|---|---|---|---|---|
| 6,073,075 | A * | 6/2000 | Kondou et al. | 701/516 |
| 6,175,740 | B1 | 1/2001 | Souissi et al. | |
| 6,326,962 | B1 * | 12/2001 | Szabo | 715/762 |
| 6,604,046 | B1 * | 8/2003 | Van Watermulen et al. | 701/533 |
| 6,832,153 | B2 * | 12/2004 | Thayer et al. | 701/465 |
| 7,130,641 | B1 | 10/2006 | Al-Khashti et al. | |
| 7,532,979 | B2 * | 5/2009 | Fuchs | 701/438 |
| 2004/0102896 | A1 * | 5/2004 | Thayer et al. | 701/207 |
| 2006/0080032 | A1 * | 4/2006 | Cooper et al. | 701/208 |
| 2007/0021125 | A1 | 1/2007 | Zhu et al. | |
| 2007/0106455 | A1 * | 5/2007 | Fuchs | 701/200 |
| 2007/0233817 | A1 * | 10/2007 | Johnson et al. | 709/219 |
| 2012/0129536 | A1 * | 5/2012 | Zou et al. | 455/444 |

FOREIGN PATENT DOCUMENTS

| | | | |
|---|---|---|---|
| KR | 2013087047 A | * | 8/2013 |
| WO | WO 2012071264 A1 | * | 5/2012 |

OTHER PUBLICATIONS

A high speed geocoding method for location-based service with coloring map images; Tajima, K.; Ando, K.; Ohshima, K.; Terada, M.; Information Networking, 2009. ICOIN 2009. International Conference on; Publication Year: 2009 , pp. 1-5.*
Impact of the location area structure on the performance of signaling channels of cellular wireless networks; Rubin, I.; Cheon Won Choi; Communications, 1996. ICC 96, Conference Record, Converging Technologies for Tomorrow's Applications. 1996 IEEE Inter. Conf. on;vol. 3; Dig. Obj. Id.: 10.1109/ICC.1996.535309; Pub.Yr 1996, pp. 1761-1765.*

(Continued)

*Primary Examiner* — Cuong H Nguyen
(74) *Attorney, Agent, or Firm* — Gowling Lafleur Henderson LLP

(57) ABSTRACT

A method for reverse geocoding location information obtained by a wireless communications device comprises determining the location information for a location, communicating the location information to a reverse geocoding server that reverse-geocodes the location information to generate location description data for a bounding region that geographically surrounds the location, receiving the location description data from the reverse geocoding server for the bounding region containing the location, and caching the location description data for the bounding region in a memory cache on the device. When the current location remains within one or more bounding regions cached on the device, location description data is fetched from the cache, thus improving application responsiveness. Only when the current location is no longer within the bounding region(s) does the device communicate a new request to the reverse geocoding server.

13 Claims, 16 Drawing Sheets

(56) References Cited

OTHER PUBLICATIONS

Search Reverse Nearest Neighbor Query on Air; Jang, InHo; Lee, SangKeun; Information Technology, 2007. ITNG '07. Fourth International Conference on; Digital Object Identifier: 10.1109/ITNG.2007.173; Publication Year: 2007 , pp. 291-296.*

Incremental and General Evaluation of Reverse Nearest Neighbors; Kang, J.M.; Mokbel, M.F.; Shekhar, S.; Tian Xia; Donghui Zhang; Knowledge and Data Engineering, IEEE Transactions on; vol. 22 , Issue: 7 Digital Object Identifier: 10.1109/TKDE.2009.133; Publication Year: 2010 , pp. 983-999.*

Finding RkNN Straightforwardly with Large Secondary Storage; Hanxiong Chen; Rongmao Shi; Furuse, K.; Ohbo, N.; Information-Explosion and Next Generation Search, 2008. INGS '08. International Workshop on; Digital Object Identifier: 10.1109/INGS.2008.12; Publication Year: 2008 , pp. 77-82.*

Reverse Nearest Neighbor Search in Metric Spaces; Yufei Tao; Man Lung Yiu; Nikos Mamoulis Knowledge and Data Engineering, IEEE Transactions on; vol. 18 , Issue: 9; Digital Object Identifier: 10.1109/TKDE.2006.148; Publication Year: 2006 , pp. 1239-1252.*

Approximate Direct and Reverse Nearest Neighbor Queries, and the k-nearest Neighbor Graph; Figueroa, K.; Paredes, R. Similarity Search and Applications, 2009. SISAP '09. Second International Workshop on; Digital Object Identifier: 10.1109/SISAP.2009.33; Publication Year: 2009 , pp. 91-98.*

Incremental In-Network RNN Search in Wireless Sensor Networks; Yung-Chiao Tseng; Chao-Chun Chen; Chiang Lee; Yuan-Ko Huang; Parallel Processing Workshops, 2007. ICPPW 2007. International Conference on; Digital Object Identifier: 10.1109/ICPPW.2007.47; Publication Year: 2007 , p. 64.*

A high speed geocoding method for location-based service with coloring map images; Tajima, K. ; Ando, K. ; Ohshima, K. ; Terada, M.; Information Networking, 2009. ICOIN 2009. International Conference on; Publication Year: 2009 , pp. 1-5.*

On the Correlation of Geographic and Network Proximity at Internet Edges and Its Implications for Mobile Unicast and Multicast Routing; Schmidt, T.C. ; Wahlisch, M. ; Ying Zhang; Networking, 2007. ICN '07. Sixth International Conference on; Digital Object Identifier: 10.1109/ICN.2007.61; Publication Year: 2007 , p. 94.*

Performance Tests and Application Strategies of Spatial Indexes in the Embedded-GIS Data Management Ma Chang-jie ; Wu Xin-Cai ; Xie-zhong; Wireless Communications, Networking and Mobile Computing, 2006. WiCOM 2006.International Conference on; Digital Object Identifier: 10.1109/WiCOM.2006.401; Publication Year: 2006 , pp. 1-4.*

Geographically bound mobile agent in MANET; Tei, K. ; Yoshioka, N. ; Fukazawa, Y. ; Honiden, S.; Mobile and Ubiquitous Systems: Networking and Services, 2005. MobiQuitous 2005. The Second Annual International Conference on Digital Object Identifier: 10.1109/MOBIQUITOUS.2005.31; Publication Year: 2005 , pp. 516-518.*

Extracting Region of Interest (ROI) Details Using LBS Infrastructure and Web-Databases; Tiwari, S. ; Kaushik, S. Mobile Data Management (MDM), 2012 IEEE 13th International Conference on; Digital Object Identifier: 10.1109/MDM.2012.29; Publication Year: 2012 , pp. 376-379.*

Generating acoustic provinces for the U.S. Navy's Low frequency bottom loss database using geographic information systems; Ruppel, T.H.; Oceans 2009, MTS/IEEE Biloxi—Marine Technology for Our Future: Global and Local Challenges Publication Year: 2009 , pp. 1-4.*

Communication from the European Patent Office (Examination Report dated Nov. 15, 2010) Complete document is relevant.

European Search Report European Patent Office Application No. 09170646.5-1248 Date: Jan. 18, 2010.

Google Maps API Services http://code.google.com/apis/maps/documentation/geocoding/.

* cited by examiner

LBS SERVICES

LOCAL WEATHER: SUNNY 25 Celsius
(*more....*)

NEARBY LANDMARKS: NATIONAL CATHEDRAL
(*more....*)

NEARBY RECREATION: *SWIMMING*, *GOLF*, *HORSEBACK RIDING*, *CAMPING*

LOCAL SHOPPING DEALS: DISCOUNT AT TOWER MALL – 30% (*more....*)

*DOWNLOAD LOCAL E-COUPONS HERE*

LOCAL NEWS: WILDFIRE CAUSES EVACUATION
(*more....*)

LOCAL EVENTS: CONCERT TONIGHT
(*more....*)

*FIG. 15*

EXPEDITING REVERSE GEOCODING WITH A BOUNDING REGION

CROSS-REFERENCE TO RELATED APPLICATIONS

This is the first application filed for the present technology.

TECHNICAL FIELD

The present technology relates to location-aware wireless communications devices and, in particular, to techniques to enable these devices to efficiently interact with a reverse geocoder.

BACKGROUND

Wireless communications devices (smart phones, cell phones, PDAs, or other such mobile devices) are becoming ubiquitous. These devices offer a panoply of features such as voice communications, e-mail, text messaging, Web browsing, calendaring, etc. Wireless communications devices equipped with Global Positioning System (GPS) receivers or other position-determining subsystems make the devices "location-aware" and thus enable a range of additional features, including navigation, location-based services, geo-tagging, and automatic location-based configuration of the device such as, for example, an automatic time-zone setting on the device. Some examples of location-based services are local weather, local news, local events, local shopping deals, identifying contacts or buddies in the immediate vicinity, providing traffic reports, alerts, etc. Location-based services can be used to locate the closest gas station, ATM, restaurant, hotel, or any other commercial or government establishment.

All of these services and features exploit knowledge of the device's current location. Many of these services such as location-based services (LBS), geotagging and automatic device configuration depend on reverse geocoding of geographical coordinates representing a current location of the device. Reverse geocoding is essentially a reverse lookup in a geographic information database that stores geographical information. Upon receipt of geographical coordinates, the reverse-geocoder determines what geographical features or entities are located at or near the coordinates. The reverse geocoder thus responds with a location description of what is at, or proximal to, the provided coordinates. Depending on the requested resolution and the filters applied, the results from the reverse-geocoder can be any sort of textual description for a location, such as, for example, a street address, city name, postal code, state/province, country, time zone, etc. At higher ("street-level") resolution, and again depending on the filtering, the reverse geocoder may return landmarks, hotels, gas stations, banks, restaurants, etc. Various GIS (geographical information service) and LBS (location-based service) databases can provide virtually any type of information— local weather, the presence of buddies/contacts, special events, alerts, etc. Another example of reverse geocoding is geo-tagging photos, videos, blogs, or other data. Reverse geocoding enables the device to determine a meaningful textual description of the location (e.g. a place name) in order to enable the device to geo-tag the data (e.g. digital photo file) with the name or description of the location where the data was created.

The request and response to and from a reverse geocoding server (reverse-geocoder) can take a few seconds, depending on network latency and the server throughput. This request-response lag negatively impacts the overall user experience and renders impractical or undesirable many otherwise useful applications that could be provided by reverse geocoding the location coordinates of the device. Not only does the conventional approach to reverse geocoding result in poor responsiveness for the application on the device but the frequent server calls have the deleterious effect of burdening both device and network resources. This has remained a technical problem for which there was, until now, no adequate solution.

BRIEF DESCRIPTION OF THE DRAWINGS

Further features and advantages of the present technology will become apparent from the following detailed description, taken in combination with the appended drawings, in which:

FIG. 15 is a schematic depiction of an example of an LBS services screen on a wireless communications device that displays local information that is stored and fetched from the LBS data cached on the device;

It will be noted that throughout the appended drawings, like features are identified by like reference numerals.

DETAILED DESCRIPTION

Figure 1:
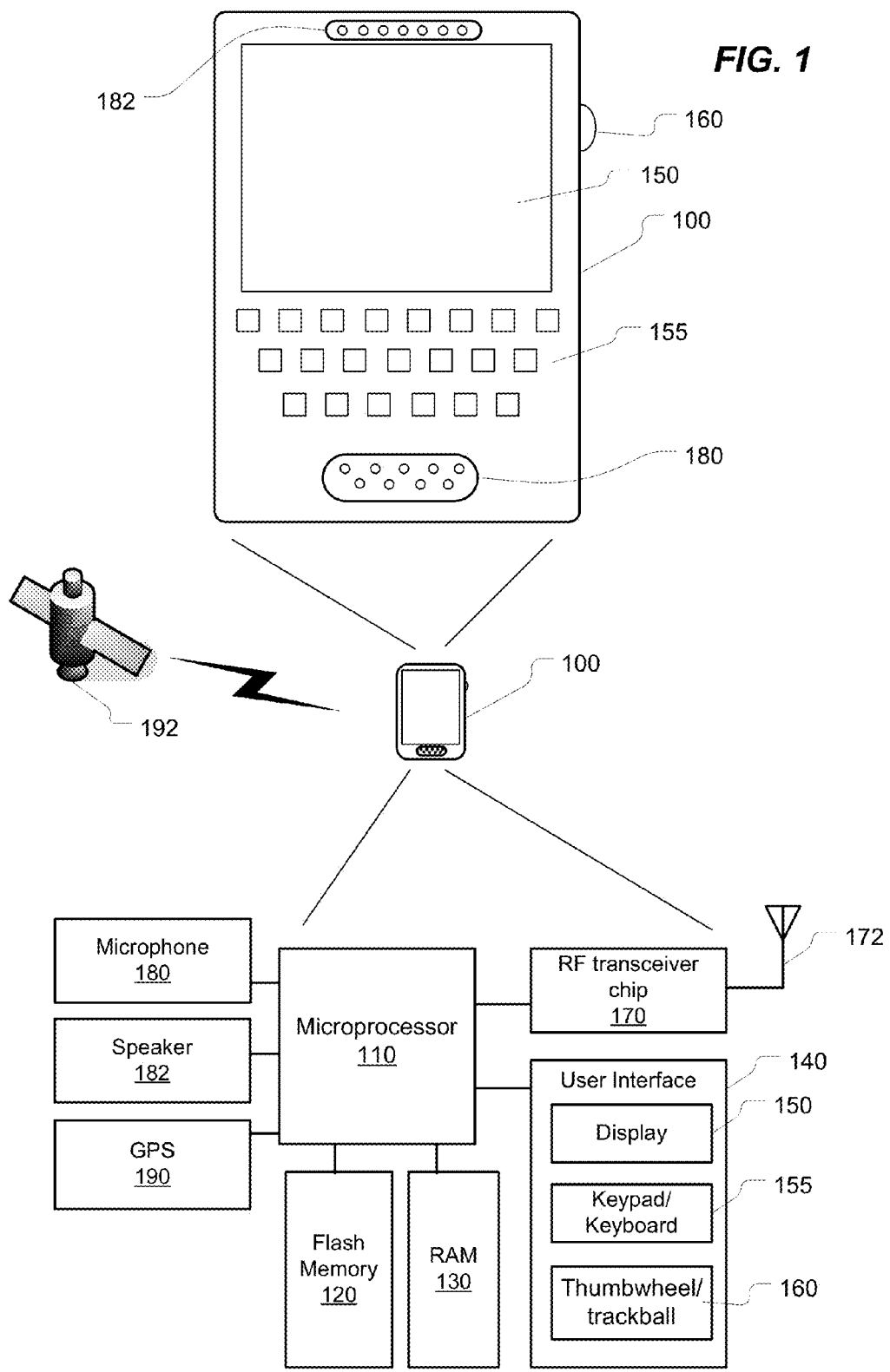
FIG. 1 is a schematic depiction of one example of a wireless communications device on which the present technology can be implemented.

In general, the present technology improves the responsiveness of an application, executing on a wireless communications device, that utilizes reverse geocoding to provide location descriptions. In some implementations, this is accomplished by caching or storing location description data obtained from the reverse geocoder for not only the location of interest but also for a bounding region that geographically surrounds the location of interest. As long as a subsequent request for location description data is for a location lying within the bounding region, the device can fetch the requested location description data from the cache or local data store. In some implementations, only if the location lies outside the bounding region does the device communicate a new request to the reverse geocoding server.

This technology may be used in conjunction with location-based services (LBS), geo-tagging, automatic location-dependent device configurations and settings, or any other application, service or feature that requires interaction with a reverse geocoder.

This novel technique not only improves the responsiveness of the application requesting the location description but also has the effect of diminishing the burden on both device and network resources. In contrast, the conventional technique inefficiently makes a request to the reverse geocoding server every time that the application requests an updated location description, which expends both device and network resources and introduces an unwanted lag in response time. The overall user experience is thus improved using this novel technology.

In particular implementations of this technology, the device may persistently store the location description data for each bounding region to thereby create a library of bounding regions on the device that can be retrieved far more expeditiously than having to make a request to the reverse geocoding server.

In other implementations, the size of the bounding region is determined by the administrative region specified by the application or, alternatively, by the resolution specified by the application. The bounding region is thus defined to enclose the location of interest while fitting inside the boundaries of the predetermined geographical entity (e.g. within a city, province, country, etc.). In other words, the administrative region or, alternatively, level of granularity specified by the application determines which one of a plurality of predetermined geographical entities to employ, e.g. whether to use a city, province, country, etc. The reverse geocoder then defines the bounding region such that the bounding region includes the location coordinates but also fits within the boundaries of whichever geographical entity is selected (city, province, country, etc.). Once the location description data for that bounding region is downloaded and cached on the device, it can be fetched rapidly from the cache by the application provided that the location coordinates remain within the bounding region.

Thus, a main aspect of the present technology is a method for reverse geocoding location information obtained by a wireless communications device. The method entails determining the location information for a location, communicating the location information to a reverse geocoding server that reverse-geocodes the location information to generate location description data for a bounding region that geographically surrounds the location, receiving the location description data from the reverse geocoding server for the bounding region containing the location, and storing the location description data for the bounding region in a memory on the device.

Another main aspect of the present technology is a computer readable medium comprising code which when loaded into memory and executed on a processor of a wireless communications device is adapted to determine the location information for a location, communicate the location information to a reverse geocoding server that reverse-geocodes the location information to generate location description data for a bounding region that geographically surrounds the location, receive the location description data from the reverse geocoding server for the bounding region containing the location, and cache the location description data for the bounding region in a memory cache on the device.

Yet another main aspect of the present technology is a wireless communications device having a processor operatively coupled to a memory for executing an application on the device, the application requesting a location description for a location. The device includes a radiofrequency transceiver for communicating location information obtained by the device for the location to a reverse geocoding server to enable reverse-geocoding of the location information to generate location description data for a bounding region that geographically surrounds the location. The transceiver is configured to receive the location description data and to provide the location description data to the memory for caching of the location description data on the device.

The details and particulars of these aspects of the technology will now be described below, by way of example, with reference to the attached drawings.

FIG. 1 is a schematic depiction of a wireless communications device 100 on which the present technology can be implemented. The term "wireless communications device" is meant to encompass a broad range of cellular and mobile devices such as, for example, smartphones, cell phones, satellite phones, wireless-enabled personal digital assistants (PDAs), or wireless-enabled computing tablets, laptops, notebooks, palm-tops, etc.

As shown schematically in FIG. 1, the wireless communications device 100 includes a microprocessor (referred to herein as a "processor") 110 operatively coupled to memory (Flash Memory 120 and/or RAM 130). The device 100 has a user interface 140 which includes a display (e.g. an LCD screen) 150, a keyboard/keypad 155. A thumbwheel/trackball 160 may optionally be provided as part of the user interface. Alternatively, the user interface 140 may include a touch screen in lieu of a keyboard/keypad. The wireless communications device 100 includes a radiofrequency (RF) transceiver chipset 170 for wirelessly transmitting and receiving data and voice communications, e.g. via a cellular network. The wireless communications may be performed using CDMA, GSM, or any other suitable communications standard or protocol. A microphone 180 and speaker 182 are provided for voice communications.

As further depicted in FIG. 1, the wireless communications device 100 includes a GPS chipset 190 (or other position-determining subsystem) to determine the current location of the device from radiofrequency signals emitted by a plurality of orbiting GPS satellites.

Although the present disclosure refers to expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

Another type of position-determining subsystem may be used as well, e.g. a radiolocation subsystem that determines its current location using radiolocation techniques, as will be elaborated below. In other words, the location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. Radiolocation techniques may also be used in conjunction with GPS in a hybrid positioning system.

References herein to "GPS" are meant to include Assisted GPS and Aided GPS.

Other location-determining subsystems may also be used to provide more granular location data. In some embodiments, it may be sufficient to determine in what country the device is operating. In other embodiments, greater precision may be necessary. These other location-determining subsystem may involve, for example, techniques based on the identity of the closest base station tower or techniques involving obtaining information stored in a home location register (HLR) or visitor location register (VLR).

Accordingly, the present technology can be implemented on the wireless communications device 100 described above and illustrated in FIG. 1. The processor and the memory cooperate to execute an application on the device that requires interaction with a reverse geocoder. The application may be a location-based services application such as, for example, a local weather service, a local events service, a traffic alert, a local shopping service, etc. The application may be a geo-tagging application to enable geo-tagging of digital photos, videos, blogs, or other data with geographically meaningful labels or textual descriptions. Alternatively, the application may provide automatic configuration or settings for the device such as, for example, automatic time-zone settings. These examples are mentioned solely to illustrate the broad applicability of this technology.

The radiofrequency (RF) transceiver 170 of the wireless communications device 100 is configured for communicating location information determined at the device to a reverse geocoding server to enable reverse geocoding of the location information in order to generate location description data for the location and an entire bounding region (bounding box, bounding polygon or other shape) that geographically surrounds the location. In most implementations, the location information will be the location coordinates of latitude and longitude. These coordinates may be determined using GPS or other means. In most implementations, the location description data is the data representing the textual description of the place at, or most proximal to, the location coordinates. For example, the location description may be a city, province, country, landmark, street address, etc.

The RF transceiver 170 is also configured to receive the location description data and to provide this data to the memory for caching on the device. The (optional) GPS chipset or other position-determining subsystem may be provided to determine the current location of the device, i.e. to generate GPS position coordinates of latitude and longitude. When the device moves around within the bounding region (e.g. bounding box), all location description data is drawn (fetched) from the local cache. Only when the device exits the bounding region must the device fetch new location description data by making a new server call. This novel technology not only improves the responsiveness of the application but also reduces the burden on the device and network.

Figure 2:
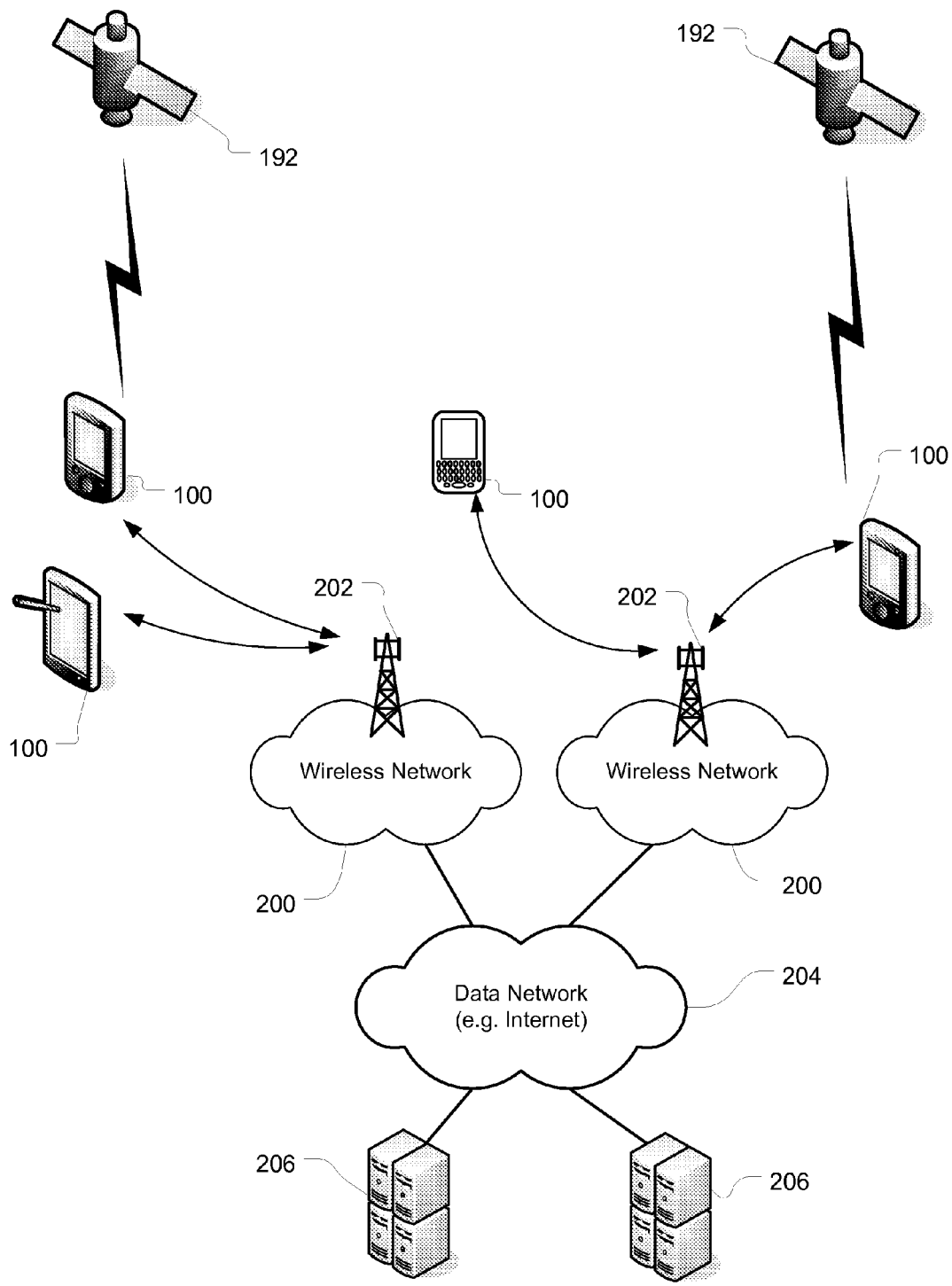
FIG. 2 is a schematic depiction of a wireless network in which an exemplary wireless communications device communicates location information to a reverse decoder in order to receive a complete bounding box of LBS data.

FIG. 2 schematically depicts, by way of example, how a plurality of wireless communications devices 100 interact with one or more reverse geocoding servers (reverse geocoders) 206. As shown, the wireless communications devices 100 communicate with the reverse geocoding servers 206 via wireless networks 200 and the Internet 204. In specific implementations that are discussed below in greater detail, the wireless communications devices 100 can communicate requests for reverse geocoding to one or more of these servers 206, which may operate independently, in tandem with other servers or as server clusters. As will elaborated below, when an application executing on the device requests location description data, the device communicates location information (e.g. GPS coordinates of latitude and longitude) to the reverse geocoding server (reverse geocoder) 206. The location description data is then returned to the device 100. As mentioned above, the conventional approach to obtaining such data was highly inefficient since frequent server calls were made every time updated data was required. This meant not only poor application responsiveness, but also a burden on device and network resources. In contrast, the present technology dramatically improves application responsiveness and reduces the burden on device and network resources by caching an entire set of location description data on the device for an entire geographical region defined by a bounding box, bounding polygon or other bounding region. As long as the device's location remains within the bounding box, the device can expeditiously fetch this data from its onboard cache. Only when the device travels beyond the geographical confines of the bounding box does the device make a new server call for updated data. This general method is explained below with regard to FIG. 3.

Figure 3:
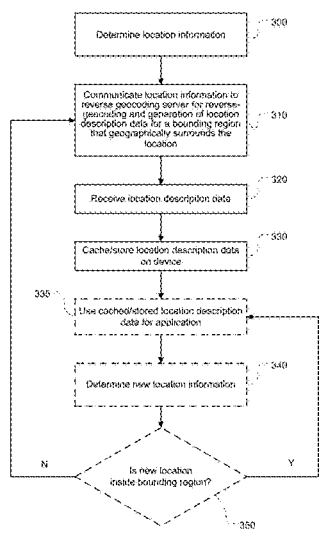
FIG. 3 is a flowchart outlining some of the main steps of a method of providing a location-based service (LBS) on a wireless communications device.
Figure 4:
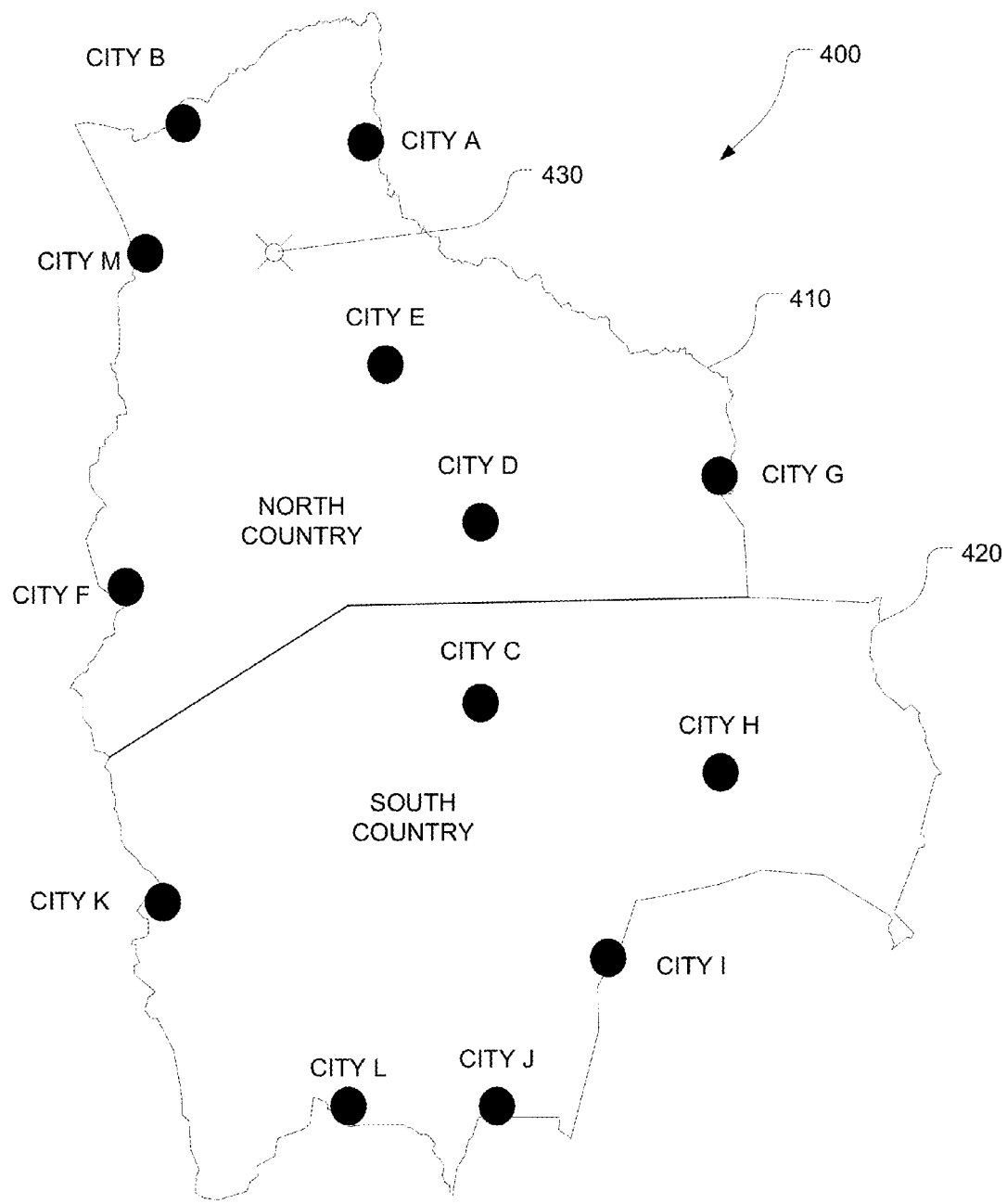
FIG. 4 depicts an example of a geographical area with which various classes of LBS data is associated.

FIG. 3 is a flowchart outlining some of the main steps of a novel method of reverse geocoding location information obtained by a wireless communications device. The method comprises a step 300 of determining location information for a location. For example, this may entail obtaining a GPS position fix. The GPS position fix provides coordinates of latitude and longitude. These coordinates are one example of "location information". Other positioning techniques (other than GPS) may be used. For example, base station ID enables identification of the city in which the device is located, which for coarse-granularity applications is sufficient. As will be appreciated, in most instances, the location is the current location of the device, as determined by GPS or any other position-determining subsystem. However, it should be appreciated that in certain instances, it be desirable to enable manual input of another (arbitrarily selected) location that is not necessarily the current location, i.e. the location may instead be a user-specified location (a location of interest, a destination, etc. that is input by the user).

Referring to FIG. 3, once location information is determined, the method further involves (at step 310) communicating the location information to a reverse geocoding server that reverse-geocodes the location information to generate location description data for a bounding region that geographically surrounds the location. The bounding region may be selected to enclose the location in question and to fit within the boundaries of a predefined geographical area or zone, i.e. to fit inside the predefined boundaries or limits of one or a plurality of predetermined geographical entities (e.g. a city, state/province, country, postal code area, etc.). For example, a weather service might require province-level resolution whereas local shopping service might specify city-level resolution. Also by way of example, a local recreational information service might require national level resolution. In any event, the bounding region (e.g. bounding box) is made as large as possible without extending beyond the predefined borders or boundaries of the predetermined geographical entity (e.g. without extending beyond national or provincial borders or city limits). Alternatively, the bounding region may be defined using any arbitrarily sized and shaped zone surrounding the location in question (e.g. a 10, 20, 50, 100, 1000 square-kilometer zone, a 10 km×20 km zone, a 20 km×50 km zone, etc.). Some examples of bounding regions are presented below to clarify these concepts.

Still referring to FIG. 3, once the location description data is generated at the server, the data for the entire bounding region is subsequently received (step 320) from the reverse geocoding server (or via any intermediary or broker) for the bounding region. At step 330, the data for the bounding region is cached and/or stored on the device in a memory cache and/or device memory (hereinafter simply the "cache" or "store"). A volatile memory such as, for example, RAM (e.g. DRAM, SRAM) may be used to cache the data on the device. The data can then be used for the application (step 335). This method can be used in conjunction with any type of application that requires interaction with a reverse geocoder, e.g. LBS or geotagging applications for identifying nearby landmarks, hotels, gas stations, banks, restaurants, etc, local weather, local news, local events, alerts, etc., or an application that automatically adjusts device configurations or settings, e.g. an automatic time-zone setting.

Thereafter, the method may further involve determining new location information for a new location (at step 340). For example, the application may request an update in location description data at predetermined time intervals or, alternatively, the device may be configured to send a request for new data when the device has moved beyond a certain predetermined distance threshold. Whatever the trigger, instead of automatically making a server call to get updated location description data, the device determines (at step 350) whether the new location lies inside or outside the bounding region (e.g. bounding box). Where the new location lies inside the bounding region, the location description data for the new location is obtained from the cache on the device. Alternatively, where the new location lies outside the bounding region, the new location information is communicated to the reverse geocoding server to enable that new location information to be reverse geocoded, i.e. a new server call is made to obtain a new bounding box.

In one implementation of this technology, the location description data for each bounding region is furthermore stored in a persistent storage on the device to thereby create a (lasting) library of bounding regions that can be quickly retrieved whenever the device is located in one of those bounding regions. For example, if the user of the device travels frequently between two cities, the bounding regions for those cities may be stored persistently on the device so that these can be recalled expeditiously when the device is located in one of those two cities. In other words, the data for one or more bounding regions may be stored permanently in a non-volatile memory (persistent storage) such as, for example, ROM, PROM, EPROM, EEPROM, Flash memory.

The foregoing method steps can be implemented as coded instructions in a machine-readable medium, computer-readable medium or as a computer program product. In other words, the computer program product, machine-readable medium or computer readable medium stores software code that is programmed to perform the foregoing steps when loaded into memory and executed on the microprocessor of the wireless communications device.

FIGS. 4-14 depict a set of examples of how the present technology is implemented to cache a bounding region of location description data. As shown by way of example in FIG. 4, a geographical area 400 consists of a North Country 410 and a South Country 420. The device has a current location 430 in the North Country. In this example, an application on the device wishes to obtain a location description for the current location 430 of the user. Accordingly, the device sends a request to a reverse geocoder to obtain this location description. In this example, the request specifies the administrative region that is sought or, alternatively, specify the level of granularity that is sought by the application.

Figure 5:
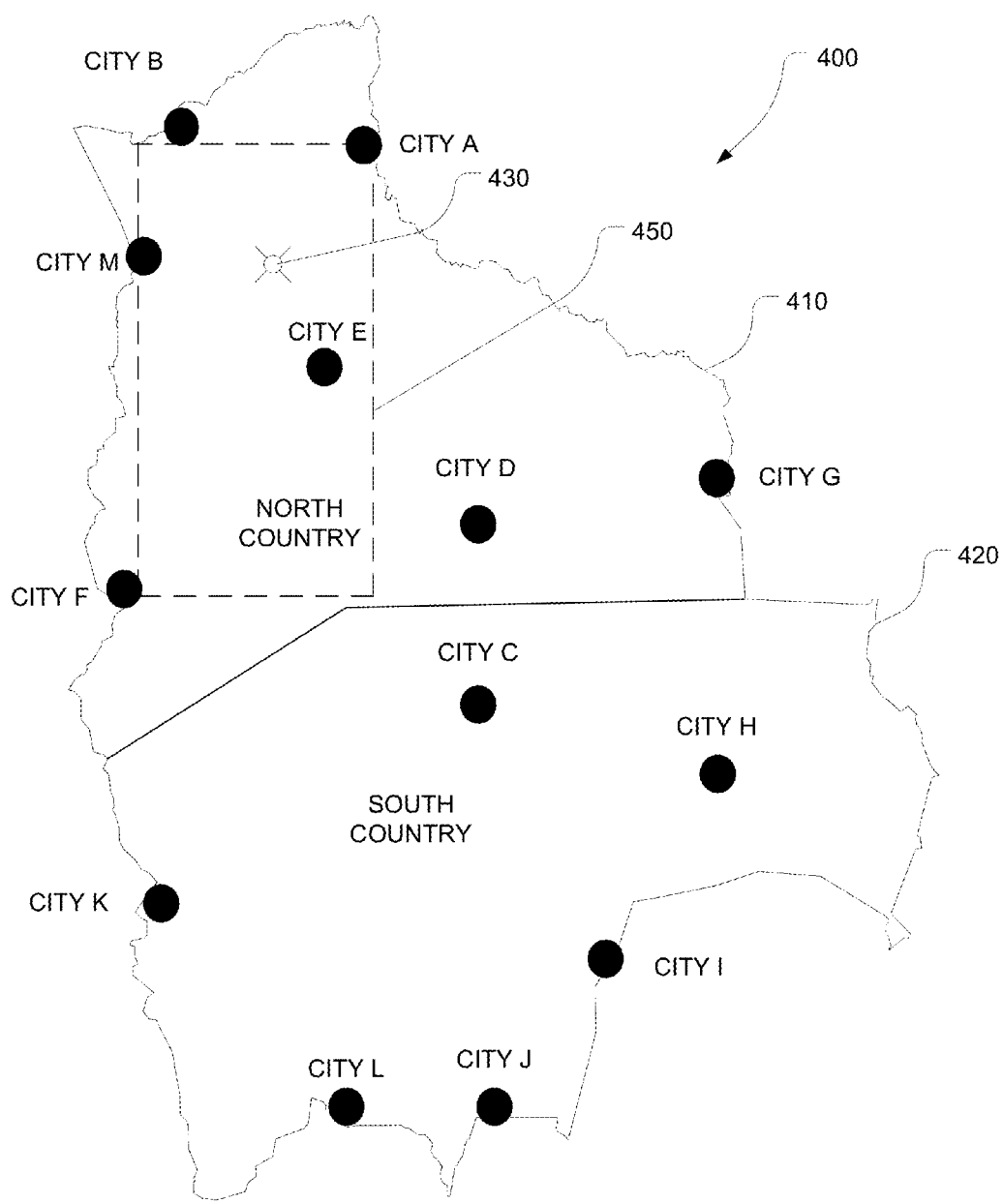
FIG. 5 depicts, by way of example, how one country of the geographical area is enclosed by a bounding box.

Based on the current location and the administrative region or level of granularity (resolution) specified by the application, the reverse geocoder determines (defines) a bounding region. In this example, it is assumed that the application requires a country-type administrative region. FIG. 5 shows a bounding region 450 enclosing the current location but which fits within the boundaries of the North Country. In this example, the bounding region is a bounding box. (A rectangular bounding box is one particularly efficient implementation of the bounding region, although other shapes may be used.) This bounding box is made as large as possible without extending beyond the boundaries of the country in which the device is currently located. As such, the bounding box 450 includes not only data for the current location 430 but also "extra" data for the surrounding area. Each bounding box is an approximation of the irregular map area with which it corresponds. In most implementation, the bounding box is determined (defined) by the server.

Figure 6:
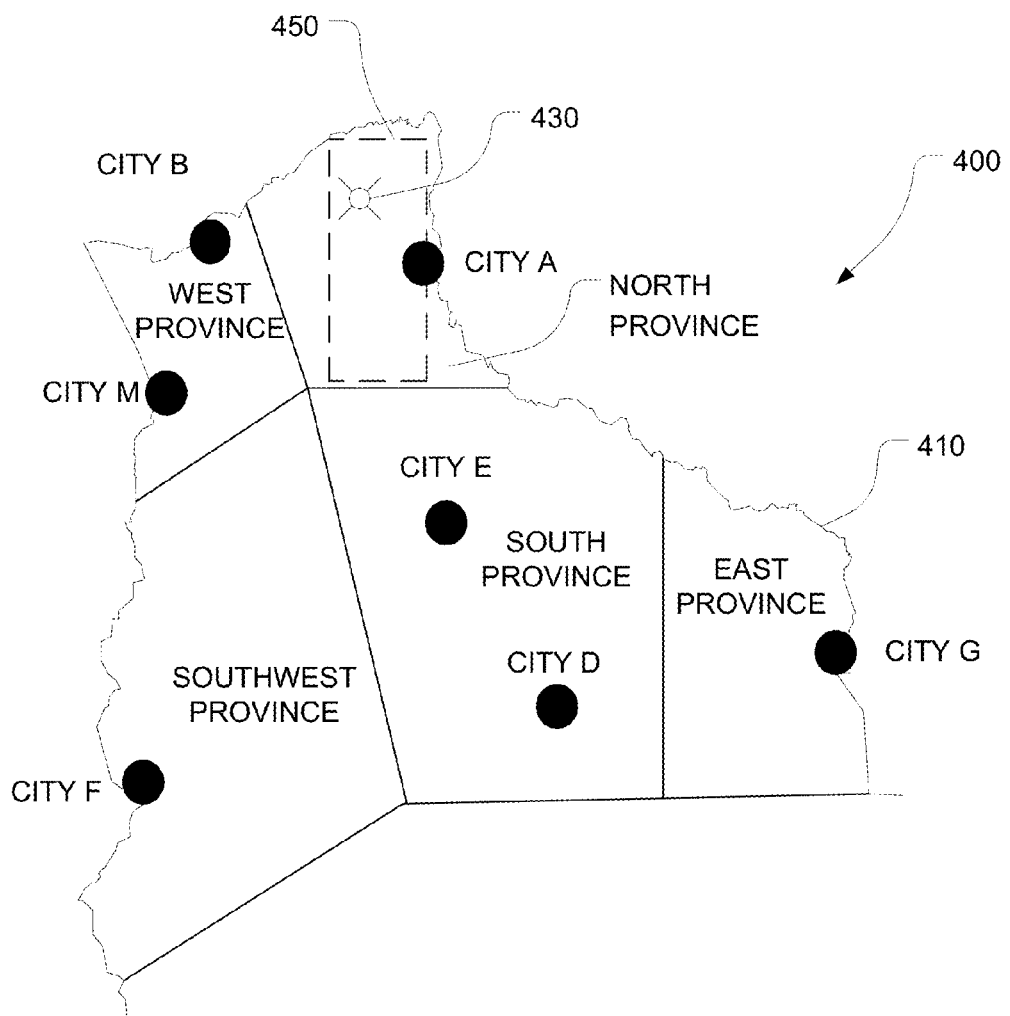
FIG. 6 depicts, by way of example, an isolated bounding box having LBS data that is downloaded and cached on the wireless communications device.
Figure 7:
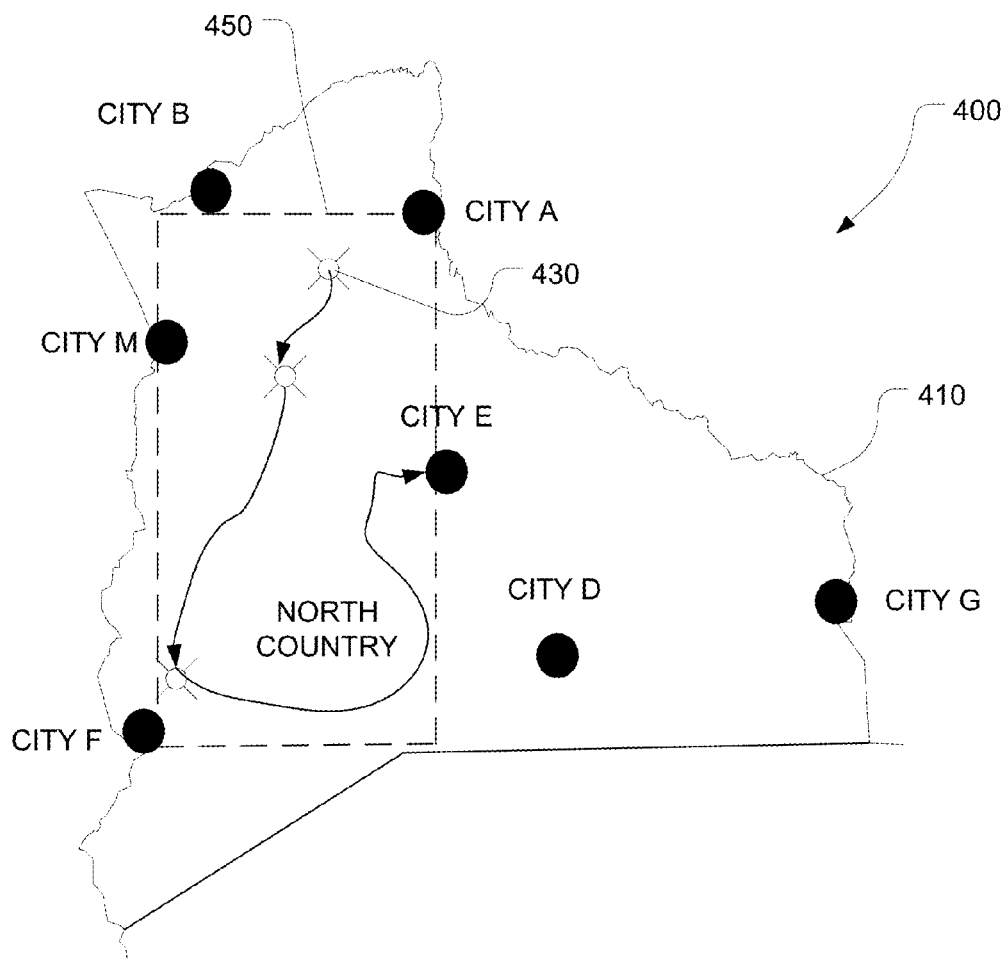
FIG. 7 depicts how the device may travel throughout the region defined by the bounding box without requiring new LBS data to be obtained.
Figure 8:
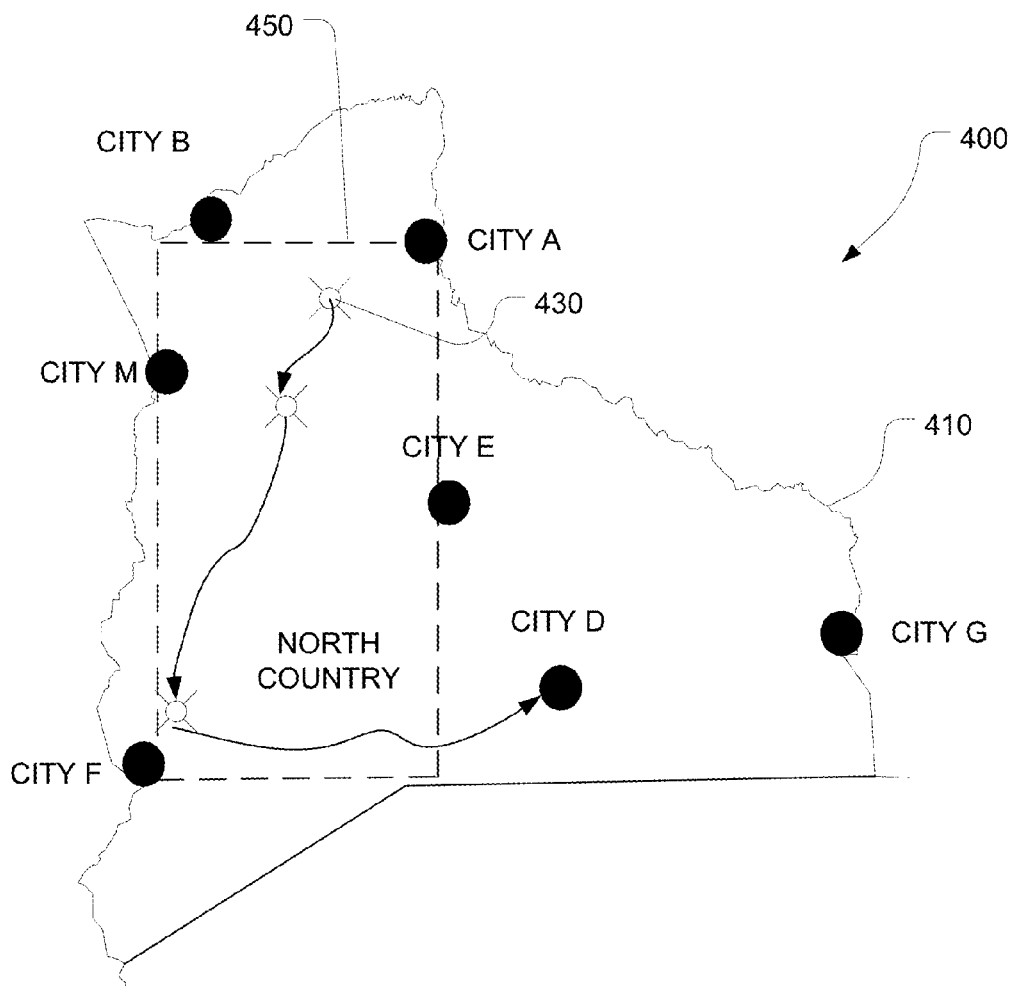
FIG. 8 depicts a scenario in which the device exits the bounding box, thus necessitating the requesting of new LBS data.

As another example if presented in FIG. 6. In this example, the application specifies a province-type administrative region. In that case, the bounding box 450 is defined to encompass the current location 430 and the largest rectangular box (assuming the bounding region is a rectangular box) that fits within the province in which the device is currently located. In other words, since the device is currently located in the North Province, the bounding box 450 is defined to be the maximum surface area box that can fitted within the boundaries of that province while still enclosing the current location 430 of the device. Once defined, the bounding box 450 is downloaded and cached (or stored) on the device. The device can thus roam within the confines of the bounding box 450 without making any server calls to the reverse geocoding server since all data for that bounding box is cached on the device, as shown in FIG. 7. Only if the device exits the confines of the bounding region (FIG. 8) must the device make a new server call to obtain new data.

In one implementation, the device may request that the reverse geocoder transmit one or more administrative regions back to the device. In main implementations, the server replies with the location description data, bounding region and type of administrative region (which is important if the server responds with multiple regions). With reference to FIG. 5, the server would return, e.g. (<bounding box1>, "North Country", Country). Thus, the server's reply contains the location description data, the bounding region and the type of administrative region (in this case, a country is the administrative region). With reference now to FIG. 6, the server may also return a multiplicity of administrative regions, e.g. (<bounding box1>, "North Country", Country), (<bounding box2>, "North Province", Province) to signal that the administrative region is a province. The administrative regions need not be hierarchical. However, in one specific implementation, the administrative regions may be hierarchical. In one particular implementation of hierarchical administrative regions, the level of resolution may be used to specify the administrative regions that are sought.

Figure 9:
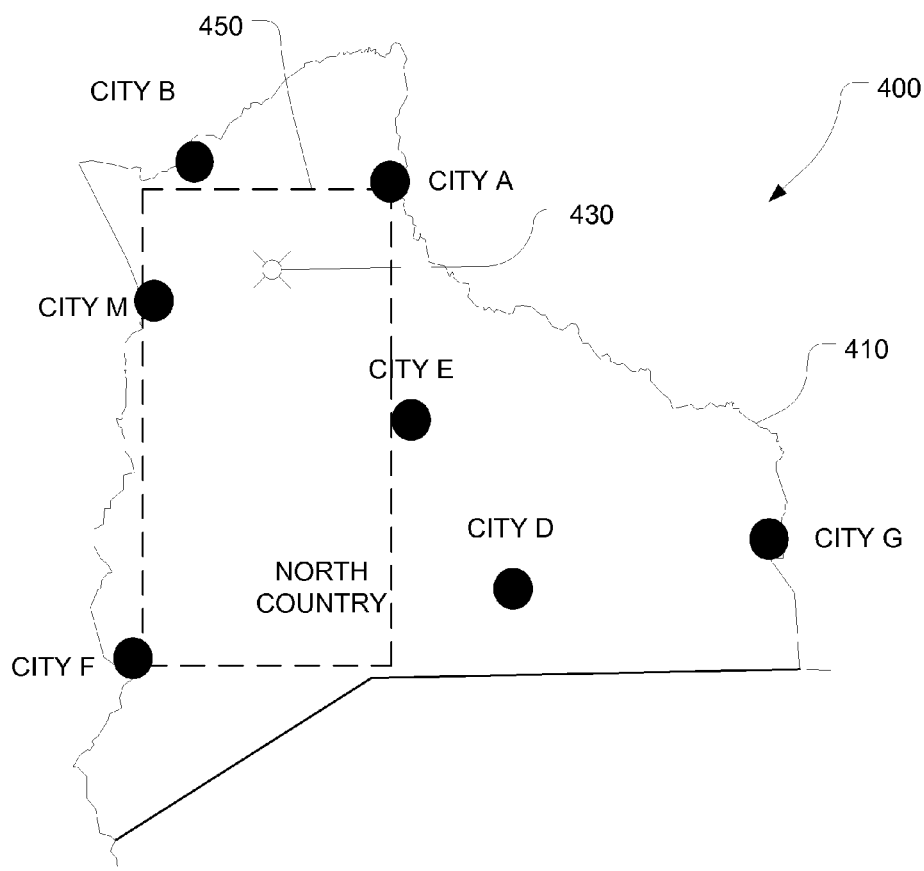
FIG. 9 depicts, by way of example, the caching of local weather information, local recreation information and local landmark information as LBS data for the bounding box.
Figure 9:
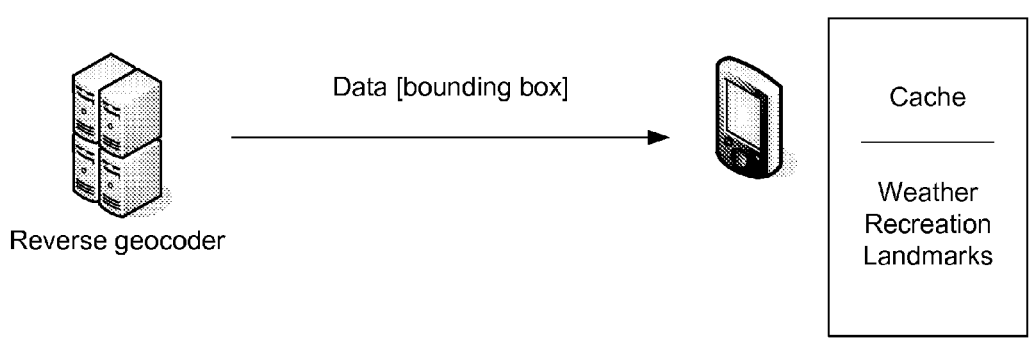
Figure 10:
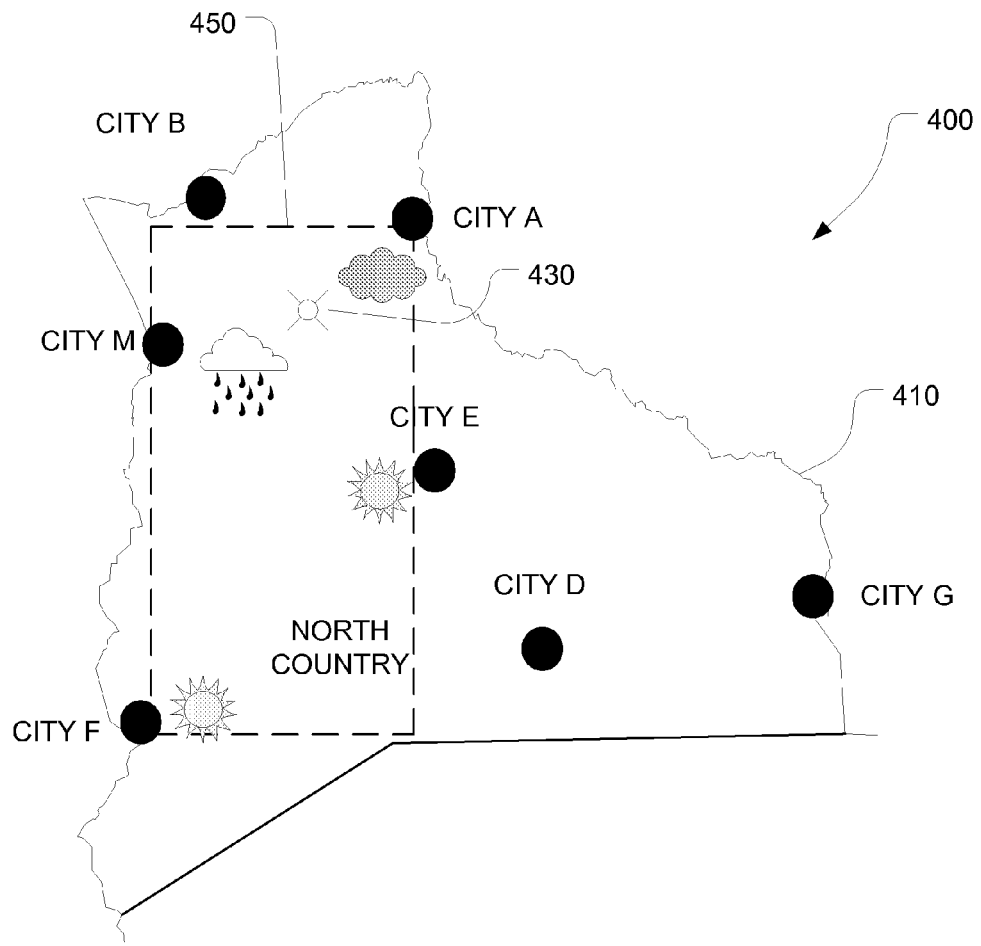
FIG. 10 depicts, by way of example, local weather information that can stored in and fetched from the LBS data cached on the device.
Figure 10:
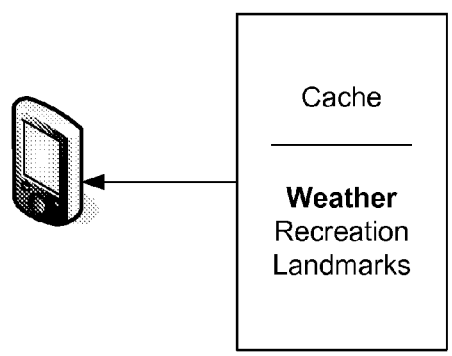
Figure 11:
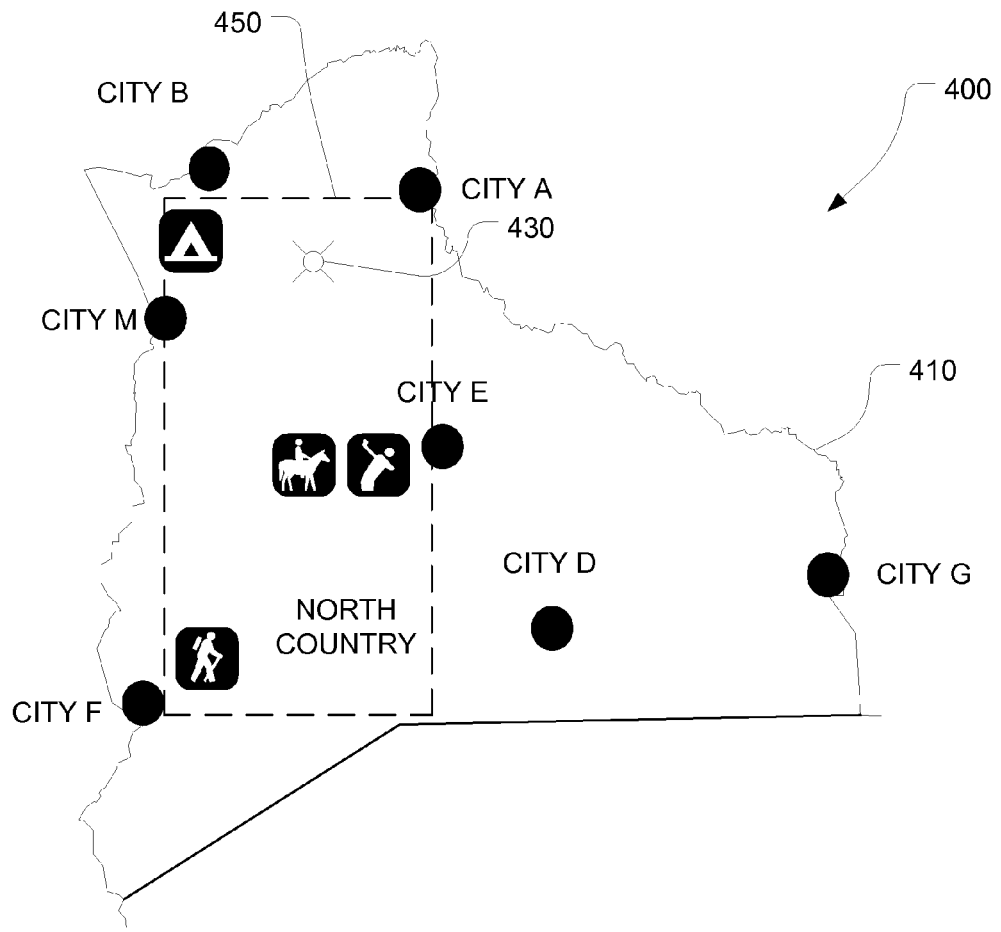
FIG. 11 depicts, by way of example, local recreation information that can be stored in and fetched from the LBS data cached on the device.
Figure 11:
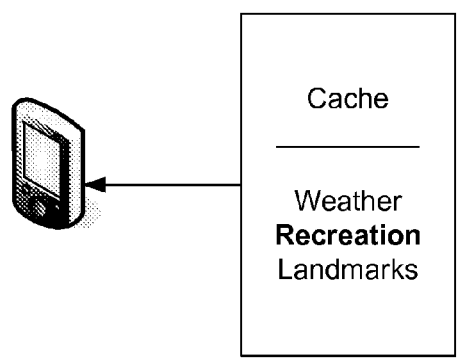
Figure 12:
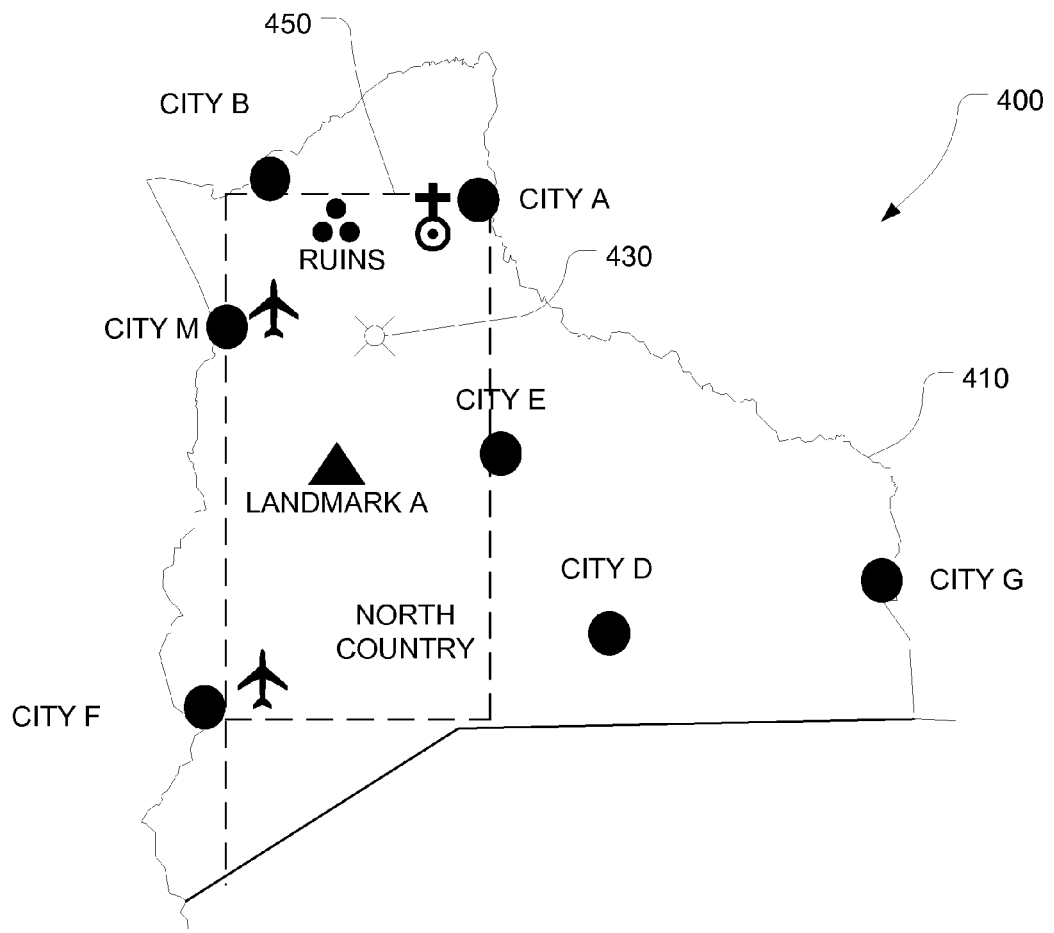
FIG. 12 depicts, by way of example, how geotagging can be efficiently performed by caching local landmark information on the device.
Figure 12:
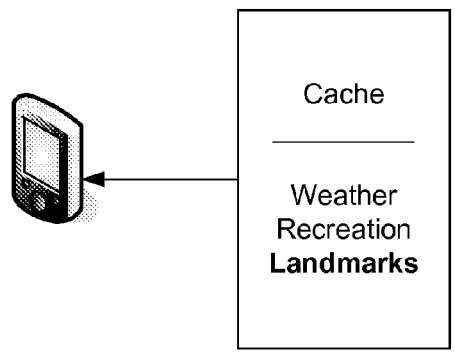

In the specific example presented in FIG. 9, data for a bounding box 450 for three different applications (weather, recreation and landmarks) is cached (or stored) on the device (assuming, for example, that all three applications require a country-level resolution). When the location-based weather service on the device requires weather data, it fetches the weather data from the data cached (or stored) on the device, as shown in FIG. 10. FIG. 11 shows how recreation data is fetched from the data cache. Similarly, FIG. 11 shows how landmark data can be fetched from the data cache (device memory) to provide location-based landmark information to the user. For example, these landmarks may be useful in geotagging photos taken with the device or geotagging other data such as videos, blogs, notes, etc.

Figure 13:
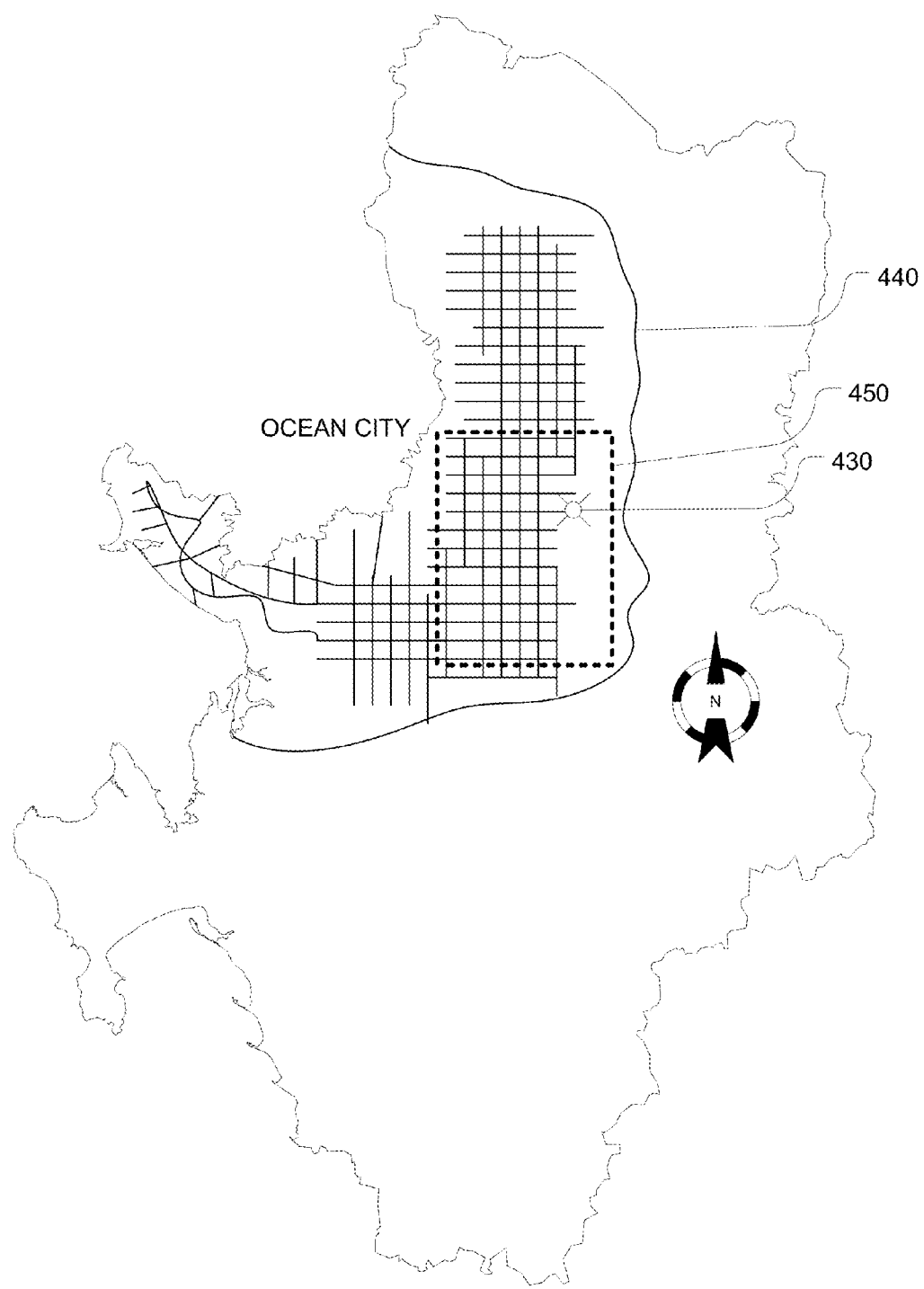
FIG. 13 depicts a bounding box being defined with city limits of a fictitious city.
Figure 14:
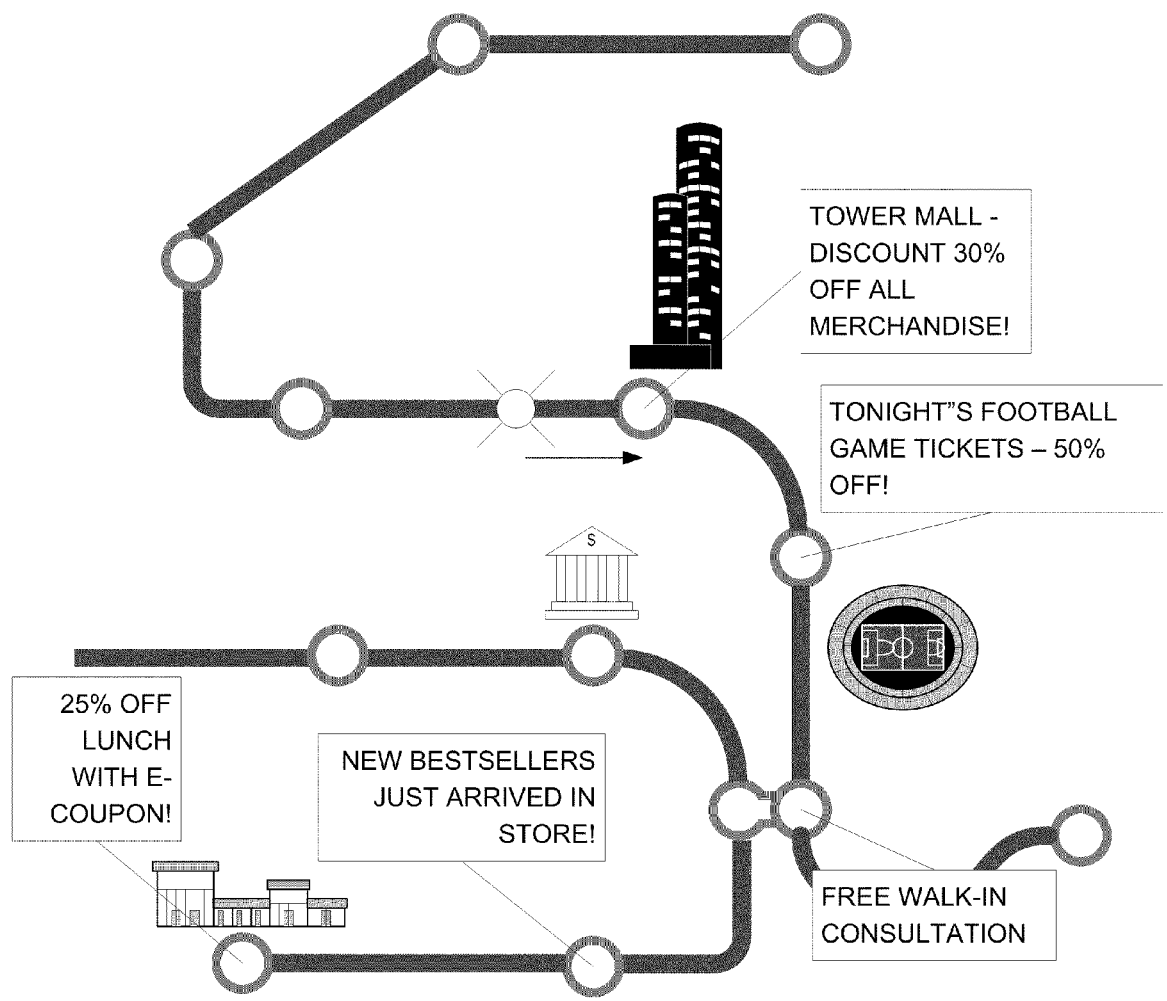
FIG. 14 depicts, by way of example, local shopping information that can be stored in and fetched from an LBS data cache for an LBS city-level shopping application.

FIG. 13 shows, by way of example, how an application may instead specify a city-level resolution to the reverse geocoder to cause the reverse geocoder to define a bounding box 450 enclosing the current location 430 of the device and that is furthermore confined with the city limits 440 of the city in which the device is currently located. The city-level bounding box 450 is then downloaded and cached on the device. This bounding box 450 may then be used for a variety of applications such as, for example, a location-based shopping service such as the one depicted by way of example in FIG. 14. For example, the device may download and cache shopping-related data for a bounding box within a city. In the particular example presented in FIG. 14, the bounding box contains shopping-related data for a fictitious downtown shopping district. As long as the device remains within the bounding box, the device fetches the location-based shopping data (e.g. deals, special offers, in-store promotions, e-coupons, etc.) directly from the cache without having to make a new server call. Caching the data is especially useful in when operating the device in a subway, underground or in heavily shielded buildings where a wireless signal may be unavailable, intermittent or too weak to reliably transmit data.

In one implementation, the location-based shopping data (or other location description data) may be stored in the cache along with the map data for the same bounding region. However, it is not essential that the corresponding map data be cached to implement this technology. In fact, it is possible that map data is concurrently cached in a different data cache or that map data corresponding to a differently sized or shaped bounding box is cached. Thus, there is not necessarily any concordance between the bounding box for the location description data and any other bounding box that may be used for the underlying map data itself. However, it will be appreciated that for certain applications, such as the one presented in FIG. 14, it is more user-friendly to display the shopping data overlaid on a map, e.g. a street map or public transit map, as shown, in which case it may be useful to also cache the map data for the same bounding box. On the other hand, the application may present the location description without any underlying map at all. Depending on the application, the location-related shopping data or location description data may optionally include its own underlying map data or it may be overlaid on a map generated using a different map application drawn from a dedicated map database in which case the location description data need not have any underlying map data.

FIG. 15 is a schematic depiction of an example of an LBS services screen on a wireless communications device that displays local information that is stored and fetched from the data cached on the device. This example shows how various location-based services can be presented without any underlying map data. This screen may also provide an options link to an options page (i.e. to a settings menu or preferences menu) to enable a user to select which LBS data to present and/or which to download and cache. This options page may also have settings or preferences to enable the user to specify the size and shape of the bounding region and whether to store data for these bounding regions in the permanent library, whether to purge any cached or permanently stored data (unwanted bounding regions), whether to update any of the cached or permanently stored bounding regions or whether to form composite regions, such as the ones shown in FIGS. 16A and 16B. Updating may be done automatically (or manually, i.e. at the user's request).

While the present technology is primarily intended to function with coarse-granularity applications, the technology can still be used for high-resolution applications. In one particular implementation, the application requiring the location description need only specify the level of granularity to the reverse geocoder. The request message to the reverse geocoder may thus use a simple code such as, for example:

0—street-based
1—region-based (country level)
2—region-based (province/state level)
3—region-based (city level)
4—region-based (postal code level)

The reverse geocoding server will return the corresponding bounding region that contains the specified latitude/longitude (in the request) and is within the indicated region for region-based reverse geocoding where the level of granularity is equal or greater than 1. The device can maintain in its cache a set of bounding regions for each level of granularity for subsequent on-device lookup. As noted above, however, this is merely a specific implementation of the more general notion of using administrative regions to specify which area to reverse geocode. In other words, the region that is required by the application may, in general, be defined using an administrative region, which may be a set of non-hierarchical, overlapping regions. Once the server receives an indication of which one or more administrative regions are desired, the bounding region for each is created to fit within each respective administrative region in question. Each bounding region for each of the one or more administrative regions is then returned to the device.

The bounding regions cached on the device may be purged after a predetermined time has elapsed (i.e. a time-based lifespan), if they are not used within a certain amount of time (i.e. a frequency-based lifespan), if the server has associated an expiry time with the region (i.e. a timestamp-based lifespan), if a newer version of the bounding region is detected (i.e. a version-based lifespan), or once the application is closed (i.e. a session-based lifespan). However, it is also possible to persist the bounding regions on the device for as long as desired, e.g. based on a user preference or setting, or only when manually purged by the user.

The bounding region, as noted above, may be a bounding box, a bounding polygon, or any other arbitrary shape. However, the rectangular box is believed to be the most efficient shape.

Figure 16A:
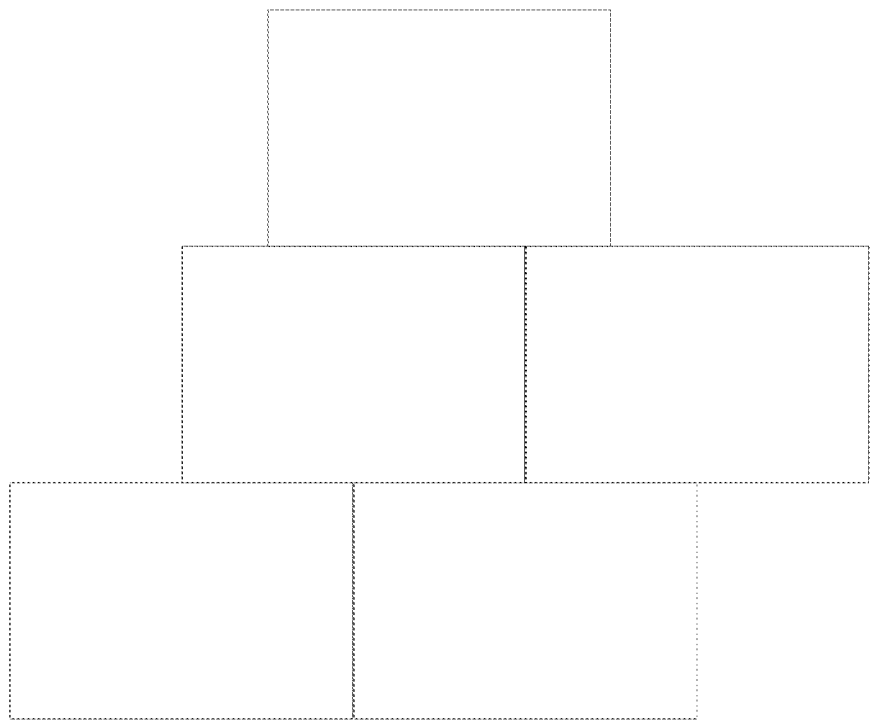
FIG. 16A is a schematic depiction of a composite bounding region composed of multiple bounding boxes.
Figure 16B:
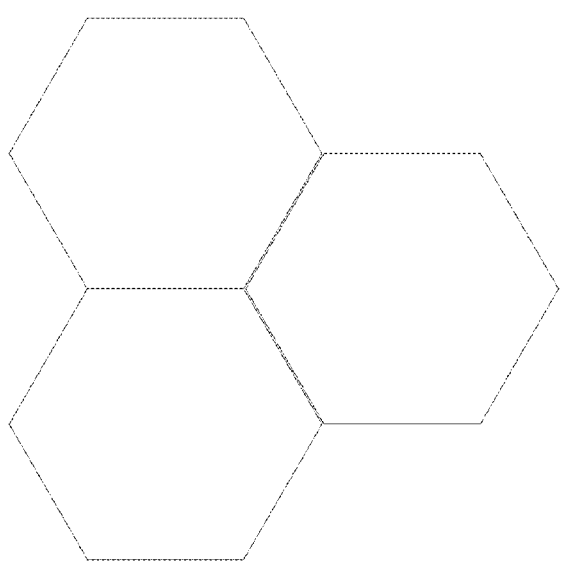
FIG. 16B is a schematic depiction of a composite bounding region composed of multiple hexagonal bounding regions.

In addition, these bounding regions may be united to form a composite bounding region. As one example, FIG. 16A is a schematic depiction of a composite bounding region composed of multiple bounding boxes. As another example, FIG. 16B is a schematic depiction of a composite bounding region composed of multiple hexagonal bounding regions. It should be appreciated that a composite bounding region may also be a hybrid composite bounding box formed by uniting one bounding region of a first shape with a second bounding region of a second shape different from the first shape.

In another implementation of this technology, the server (reverse geocoder) may transmit a plurality of administrative regions back to the device. These administrative regions may or may not be hierarchical. In other words, the resulting bounding regions for each of the requested administrative regions may overlap without one being properly contained within another. For example, a company may wish to reverse geocode sales regions as well as provinces.

This new technology has been described in terms of specific implementations and configurations which are intended to be exemplary only. The scope of the exclusive right sought by the Applicant is therefore intended to be limited solely by the appended claims.

The invention claimed is:

1. A method for reverse geocoding location information obtained by a wireless communications device, the method comprising:
    determining the location information for a location;
    determining a type of administrative region required by an application on the device;
    communicating the location information and the type of administrative region to a reverse geocoding server that defines a bounding region of a predetermined shape based on the administrative region and reverse-geocodes the location information to generate location description data for the bounding region that geographically surrounds the location and fits inside boundaries of a predetermined geographical entity that is determined by the type of administrative region;
    receiving the location description data from the reverse geocoding server for the bounding region containing the location; and
    storing the location description data for the bounding region in a memory on the device.

2. The method as claimed in claim 1 further comprising:
    determining new location information for a new location;
    where the new location lies inside the bounding region, obtaining the location description data for the new location from the memory on the device; and
    where the new location lies outside the bounding region, communicating the new location information to the reverse geocoding server.

3. The method as claimed in claim 2 further comprising storing the location description data for each bounding region in a persistent storage on the device to thereby create a library of bounding regions.

4. The method as claimed in claim 1 further comprising uniting a plurality of bounding regions stored on the device to form a composite bounding region.

5. A wireless communications device comprising:
    a processor operatively coupled to a memory for executing an application on the device, the application requesting a location description for a location and wherein the processor is configured to determine a type of administrative region required by an application on the device; and
    a radiofrequency transceiver for communicating location information obtained by the device for the location and the type of administrative region to a reverse geocoding server to enable defining of a bounding region of a predetermined shape based on the administrative region and reverse-geocoding of the location information to generate location description data for the bounding region that geographically surrounds the location and fits inside boundaries of a predetermined geographical entity that is determined by the type of administrative region;
    wherein the transceiver is configured to receive the location description data and to provide the location description data to the memory for caching of the location description data on the device.

6. The method as claimed in claim 1 wherein the reverse geocoding server determines which one of a plurality of predetermined geographical entities to use for defining the bounding region.

7. The method as claimed in claim 1 wherein communicating the location information to the reverse geocoding server comprises specifying a plurality of administrative regions to enable the server to define a plurality of bounding regions for each one of the administrative regions.

8. The method as claimed in claim 1 wherein receiving the location description data comprises also receiving the bounding region and type of administrative region for one or more administrative regions.

9. A computer readable medium comprising code which when loaded into memory and executed on a processor of a wireless communications device is adapted to:
    determine the location information for a location;
    determine a type of administrative region required by an application on the device;
    communicate the location information and the type of administrative region to a reverse geocoding server that defines a bounding region of a predetermined shape based on the administrative region and reverse-geocodes the location information to generate location description data for the bounding region that geographically surrounds the location and fits inside boundaries of a predetermined geographical entity that is determined by the type of administrative region;
    receive the location description data from the reverse geocoding server for the bounding region containing the location; and
    cache the location description data for the bounding region in a memory cache on the device.

10. The device as claimed in claim 5 wherein the processor is configured to create a composite bounding region by uniting a plurality of bounding regions.

11. The device as claimed in claim 5 wherein the processor is configured to:
    receive a request for new location information from the application;
    determine if a new location is inside or outside the bounding region;
    obtain the location description data for the new location from the cache on the device if the new location lies inside the bounding region; and
    communicate new location information to the reverse geocoding server if the new location lies outside the bounding region.

12. The device as claimed in claim 5 wherein the radiofrequency transceiver communicates location information and one or more administrative regions to the reverse geocoding server to enable the server to define bounding regions for each of the one or more administrative regions specified by the device.

13. The device as claimed in claim 5 wherein the predetermined geographical entity is selected from the group consisting of districts, cities, counties, states/provinces, countries, continents, telephone area code areas, postal code areas, electoral areas.

* * * * *